US012202423B2

(12) United States Patent
Meier et al.

(10) Patent No.: US 12,202,423 B2
(45) Date of Patent: Jan. 21, 2025

(54) ROLLOVER DEVICE FOR A PASSENGER COMPARTMENT OF A MOTOR VEHICLE, METHOD OF PRODUCTION THEREOF AND MOTOR VEHICLE

(71) Applicant: Dr. Ing. h.c. F. Porsche Aktiengesellschaft, Stuttgart (DE)

(72) Inventors: Thomas Meier, Rheinstetten (DE); Thiemo Erb, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 184 days.

(21) Appl. No.: 17/983,482

(22) Filed: Nov. 9, 2022

(65) Prior Publication Data

US 2023/0234528 A1 Jul. 27, 2023

(30) Foreign Application Priority Data

Jan. 26, 2022 (DE) .................. 10 2022 101 795.8

(51) Int. Cl.
| | |
|---|---|
| *B60R 21/13* | (2006.01) |
| *B62D 27/02* | (2006.01) |
| *B62D 27/06* | (2006.01) |
| *B62D 29/04* | (2006.01) |

(52) U.S. Cl.
CPC ............ *B60R 21/13* (2013.01); *B62D 27/026* (2013.01); *B62D 27/065* (2013.01); *B62D 29/048* (2013.01); *B60R 2021/137* (2013.01)

(58) Field of Classification Search
CPC .... B60R 21/13; B62D 27/026; B62D 27/065; B62D 29/048
See application file for complete search history.

(56) References Cited

U.S. PATENT DOCUMENTS

| | | | |
|---|---|---|---|
| 4,900,058 A | 2/1990 | Hobrecht et al. | |
| 5,228,259 A * | 7/1993 | Haddad | B62D 33/044 52/653.2 |
| 5,525,001 A * | 6/1996 | Perkins | F16C 11/045 403/388 |
| 9,394,001 B2 * | 7/2016 | Andree | B62D 29/043 |
| 10,605,285 B2 * | 3/2020 | Czinger | F16B 11/008 |

(Continued)

FOREIGN PATENT DOCUMENTS

| | | |
|---|---|---|
| CN | 101559788 A | 10/2009 |
| DE | 4444894 A1 | 6/1996 |

(Continued)

OTHER PUBLICATIONS

DE-102011109601-A1 (machine translation) (Year: 2013).*
DE-20207338-U1 (machine translation) (Year: 2002).*

*Primary Examiner* — Jason D Shanske
*Assistant Examiner* — Joselynn Y Sliteris
(74) *Attorney, Agent, or Firm* — Buchanan Ingersoll & Rooney PC

(57) ABSTRACT

A rollover device for a passenger compartment of a motor vehicle includes a plurality of struts made of fiber-reinforced plastic, and a plurality of fastening feet made of metallic material for connecting the rollover device to a vehicle body. At least one fastening foot made of metallic material is connected to a respective strut made of fiber-reinforced plastic via a material-locking connection on the one hand and via a form-locking connection on the other hand.

13 Claims, 4 Drawing Sheets

(56) References Cited

U.S. PATENT DOCUMENTS

| | | | | |
|---|---|---|---|---|
| D1,028,841 S | * | 5/2024 | Schmölz | D12/222 |
| 2011/0158741 A1 | * | 6/2011 | Knaebel | B62D 27/026 |
| | | | | 156/293 |
| 2018/0170219 A1 | | 6/2018 | Deschamps | |

FOREIGN PATENT DOCUMENTS

| | | | | |
|---|---|---|---|---|
| DE | 29813106 U1 | | 10/1998 | |
| DE | 19931224 A1 | | 1/2001 | |
| DE | 20207338 U1 | * | 9/2002 | ........... B62D 29/043 |
| DE | 102011109601 A1 | * | 2/2013 | ........... B62D 29/048 |
| DE | 102020117426 A1 | | 1/2022 | |
| WO | 2005092671 A2 | | 10/2005 | |

* cited by examiner

ROLLOVER DEVICE FOR A PASSENGER COMPARTMENT OF A MOTOR VEHICLE, METHOD OF PRODUCTION THEREOF AND MOTOR VEHICLE

CROSS-REFERENCE TO RELATED APPLICATION

This application claims priority to German Patent Application No. 10 2022 101 795.8, filed Jan. 26, 2022, the content of such application being incorporated by reference herein in its entirety.

FIELD OF THE INVENTION

The invention relates to a rollover device for a passenger compartment of a motor vehicle. The invention also relates to a method for producing such a rollover device and a motor vehicle comprising such a rollover device.

BACKGROUND OF THE INVENTION

DE 44 44 894 C2, which is incorporated by reference herein, discloses a roll bar for the passenger compartment of a motor vehicle, the load-bearing elements of which are made of metal. The roll bar comprises tubular frame portions which together constitute a main bracket, and further tubular frame portions which together constitute a support bracket. The roll bar can be fastened to the adjoining fixed vehicle body with mounting plates which are fixedly connected to the frame portions.

U.S. Pat. No. 4,900,058 A, which is incorporated by reference herein, discloses a substantially metallic rollover device for the exterior of a motor vehicle. The rollover device comprises a main bracket consisting of three individual elements connected in a form-locking manner and a support bracket consisting of two individual struts. It is fastened to the vehicle body via mounts fastened to the rollover device in a form-locking manner.

WO 2005/092 671 A2, which is incorporated by reference herein, likewise discloses a rollover device for a motor vehicle. This rollover device extends substantially in the longitudinal direction of the vehicle and is partly positioned in the field of view of the driver of the motor vehicle.

Rollover devices are also disclosed in CN 101 559 788 A, which is incorporated by reference herein, and in US 2018/0 170 219 A1, which is incorporated by reference herein.

There exists a need for a rollover device for the passenger compartment of a motor vehicle which is both lightweight and robust, in particular against forces in the vertical direction of the vehicle, the transverse direction of the vehicle and in the direction of travel, and which can be mounted on the vehicle body such that it is robust when subjected to forces acting upon it in the longitudinal direction of the vehicle.

SUMMARY OF THE INVENTION

The rollover device according to aspects of the invention for a passenger compartment of a motor vehicle comprises a plurality of struts made of fiber-reinforced plastic and a plurality of fastening feet made of metallic material for connecting the rollover device to a vehicle body. At least one fastening foot made of metallic material is connected to a respective strut made of fiber-reinforced plastic via a material-locking connection on the one hand and via a form-locking connection on the other hand.

The use of fiber-reinforced plastic for the struts of the rollover device enables a weight-optimized design of the rollover device while at the same time being extremely robust. Metal fastening feet additionally ensure robust connectability to the vehicle body, which cannot be achieved with fastening feet made of fiber-reinforced plastic due to the unfavorable load cases for fiber-reinforced plastic. These load cases can include high local surface pressures and shear or bending stresses.

The connection of a respective fastening foot to a respective strut both via a material-locking connection and via a form-locking connection is robust, in particular against forces in the vertical direction of the vehicle, the transverse direction of the vehicle and in the direction of travel, and permits robust mounting of the rollover device on the vehicle body when forces act upon them in the longitudinal direction of the vehicle.

The struts of the rollover device preferably form a main bracket and a support bracket for the main bracket. The main bracket comprises a transverse strut which extends in the transverse direction of the vehicle and vertical struts which are positioned on either side of the transverse strut and extend in the vertical direction of the vehicle. The first ends of the vertical struts facing away from the transverse strut can be connected to the vehicle body via first fastening feet which engage on said first ends. The design provides the advantage that the loads in the vertical direction of the vehicle can be introduced into the vehicle body in a targeted manner via the main bracket, thus enabling a lightweight design of the other struts while still ensuring the robustness of the rollover device. The support bracket, which is disposed behind the main bracket viewed in the longitudinal direction of the vehicle, comprises longitudinal struts which extend in the longitudinal direction of the vehicle and in the vertical direction of the vehicle and at least one stiffening strut which extends between the longitudinal struts. The longitudinal struts of the support bracket can be connected to the vehicle body with the first ends of the longitudinal struts which face away from the main bracket via second fastening feet which engage on said first ends. The support bracket for the main bracket provides the advantage that the main bracket does not have to be attached to the vehicle body in a torque-resistant manner to also be able to absorb forces in the longitudinal direction of the vehicle. This makes it possible to design the connections of the rollover device to the vehicle body in a manner more weight-optimized than torque-resistant connections. The separation of the rollover device into the main bracket and the support bracket creates clearly defined load cases for the struts. This makes it possible to achieve both the required robustness and a low weight of the rollover device. At least the second fastening feet are connected to the longitudinal struts of the support bracket via a material-locking connection on the one hand and via a form-locking connection on the other hand. This ensures a robust connection of the second fastening feet to the longitudinal struts, also in pulling direction. A high degree of security under tensile stress for the connection of the respective strut to the respective fastening foot is of critical importance because, when the rollover device is used, forces can act on the rollover device in the longitudinal direction of the vehicle and can result in tensile stress on the connection of the respective strut to the respective fastening foot.

The first fastening feet can also be connected to a respective strut of the main bracket, specifically to a vertical strut of the main bracket, via a material-locking connection on the one hand and via a form-locking connection on the other hand.

The material-locking connection of the respective fastening foot to the respective strut is preferably implemented as an adhesive connection. An adhesive connection is a material-locking connection that is very robust but lightweight. An adhesive connection is also very well suited for connecting metallic materials to fiber-reinforced plastics, because said connections do not cause high surface pressures during assembly.

The form-locking connection of the respective fastening foot to the respective strut is preferably implemented as a bolt connection or as a screw connection or as a rivet connection. These form-locking connections have the advantage that they are very robust and at the same time have little own weight. It is furthermore also possible to see from the outside whether the aforementioned connections have been correctly installed without dismantling them. This is of great importance as part of ensuring the robustness of the rollover device.

The respective fastening foot preferably projects partly into the first end of the respective strut, which is at least partly hollow, thereby forming an overlap region with the respective strut. The material-locking connection is configured along the overlap region. To create the form-locking connection, at least one form-locking fastening means extends through the respective overlap region, in particular where the material locking connection is configured. When the respective connection of the respective strut to the respective fastening foot is subjected to tensile stress, the overlap region is subjected to shear stress. Material-locking connections can absorb a shear stress in a particularly advantageous manner, because these connections have a particularly high level of robustness with respect to shear stresses. As a result, the rollover device can be designed to be both lightweight and robust.

Openings are preferably configured in the first end of the respective strut and in the respective fastening foot in the overlap region thereof, through which the at least one form-locking fastening means extends. The material-locking and the form-locking connections are thus both disposed in the same portion of the struts, which provides weight advantages. The openings are implemented in pairs as entry openings and exit openings and are respectively configured opposite to one another on the first end of the respective strut and in the respective fastening foot. Disposing the openings opposite to one another prevents the development of particularly weakened regions in the respective strut and in the respective fastening foot. The longitudinal axes of the paired openings in the first ends of the respective strut and in the respective fastening foot are disposed on a straight line. The entry openings have a larger diameter than the exit openings.

The respective form-locking fastening means is preferably implemented as a bolt. The respective bolt comprises a recess in the diameter which abuts an inner side of a boundary of the exit opening of the respective fastening foot as a stop, and thus defines an insertion depth for the bolt into the respective fastening foot. The defined insertion depth simplifies assembly and control of the proper assembly. This is advantageous for process-stable compliance and for control of the proper assembly of the rollover device. A lightweight and robust rollover device, which can be robustly mounted on the vehicle body can thus be provided in a particularly advantageous manner.

The respective bolt preferably comprises an internal thread on a bolt end which has the smaller diameter than the other bolt end. The respective bolt is secured against loosening by a screw in the internal thread. Securing the respective bolt against loosening, i.e. against falling out of the entry openings, is advantageous, so that the robustness of the rollover device remains ensured over its entire service life. The screw head of the respective screw projects beyond the respective bolt in the radial direction of the respective screw.

The respective first end of the respective strut comprises a depression on an outer side thereof around the exit opening, which is configured such that, during tightening, the respective screw abuts the respective bolt but not the first end of the respective strut. This geometry prevents surface pressure on the fiber-reinforced plastic in the region of the screw head, even if the screw is strongly tightened. This prevents an unfavorable load case for the respective strut, which at the same time enables a high level of robustness against forces acting from the outside and a weight-optimized design of the respective strut. A lightweight and robust rollover device, which can be robustly mounted on the vehicle body can thus be provided in a particularly advantageous manner.

The inner diameters of the respective entry openings and the respective exit openings and the outer diameters of the bolt ends of the respective bolt are preferably dimensioned such that there is a press fit at least between the respective bolt and the respective fastening foot. This ensures that, when the connection of the respective strut to the respective fastening foot is subjected to tensile stress, both connections, i.e. both the material-locking connection and the form-locking connection, act simultaneously and each connection absorbs a part of the tensile stress. This ensures a particularly high level of robustness for the connection. A lightweight and robust rollover device, which can be robustly mounted on the vehicle body can thus be provided in a particularly advantageous manner.

The respective bolt is preferably made of metallic material. This makes it possible to ensure a high level of robustness for the bolts.

The respective bolt is preferably hollow or made of solid material in an inner threadless region and thus in a region thereof without an internal thread. A hollow implementation is particularly advantageous for a low weight of the rollover device, a solid material implementation is particularly advantageous for the robustness of the rollover device.

The respective fastening foot preferably comprises at least one introduction opening and one discharge opening for adhesive. The respective fastening foot further comprises a peripheral groove in the overlap region, which is configured to receive a seal that seals the overlap region in the longitudinal direction of the respective strut. An adhesive connection can thus be realized by pressing the adhesive into the introduction opening. The discharge opening for adhesive provides the advantage that, during the production process, it is possible to determine without additional aids whether the overlap region is sufficiently filled with adhesive by pressing adhesive into the introduction opening until a portion of it comes out of the overlap region again, from the discharge opening. The seal prevents the adhesive from flowing into the hollow portion of the respective strut. This makes it possible to ensure a process-reliable production of the material-locking connection.

BRIEF DESCRIPTION OF THE DRAWINGS

Preferred further developments of the invention will emerge from the following description.

Design examples of the invention will be explained in more detail with reference to the drawing, without being restricted thereto. The figures show.

DETAILED DESCRIPTION OF THE INVENTION

Figure 1:
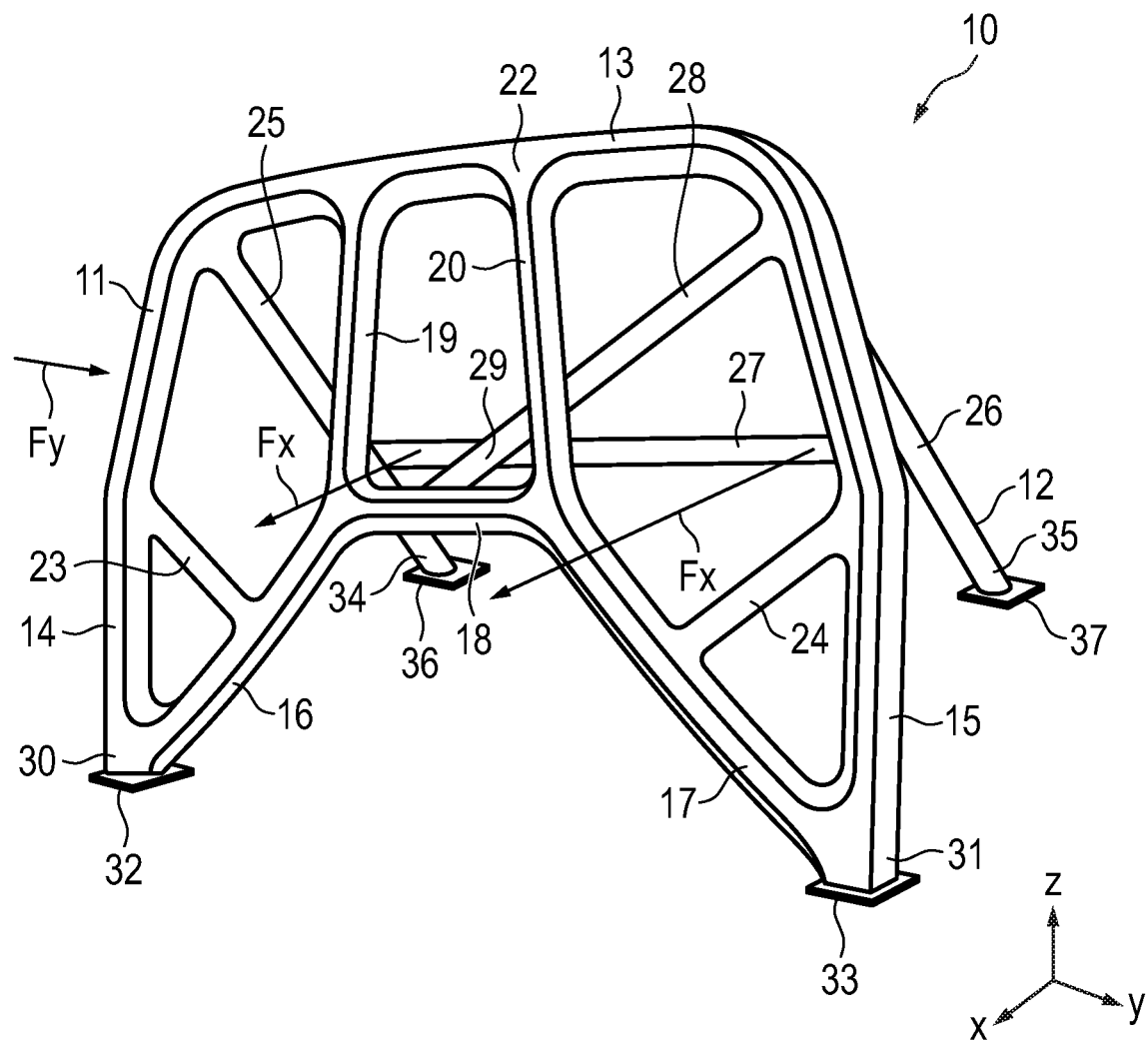
FIG. 1 is a perspective view of a preferred design example of a rollover device according aspects of to the invention from the front.

The preferred design example of a rollover device 10 according to aspects of the invention shown in a perspective view in FIG. 1 comprises a main bracket 11 and a support bracket 12. The main bracket 11 comprises a transverse strut 13 which extends in the transverse direction y of the vehicle, and vertical struts 14 and 15 which extend substantially in the vertical direction z of the vehicle and are connected at a respective end to a respective end of the transverse strut 13.

Two diagonal struts 16 and 17, which are connected at a respective end to a first, lower end of a respective vertical strut 14 and 15, are preferably installed to stiffen the main bracket 11. The diagonal struts 16 and 17 are further connected at opposite ends to a connecting strut 18 which extends in the transverse direction y of the vehicle and, via a respective central strut 19 and 20 which extends in the vertical direction z of the vehicle, to the transverse strut 13. The connections 21 and 22 of the central struts 19 and 20 to the transverse strut 13 are implemented in a particularly robust and flexurally rigid manner. This improves the robustness of the main bracket 11 against an outer lateral force Fy acting in the transverse direction y of the vehicle.

To further stiffen the main bracket 11, two stiffening struts 23 and 24 are preferably respectively attached between one of the vertical struts 14 and 15 and one of the diagonal struts 16 and 17. This achieves truss-like triangular structures that are particularly rigid with respect to forces acting from the outside in the plane of the triangle.

The support bracket 12 comprises two longitudinal struts 25 and 26, which extend in the longitudinal direction x of the vehicle and in the vertical direction z of the vehicle and are respectively connected at one end on the main bracket 11. The support bracket 12 further comprises a stiffening strut 27, which is configured as a horizontal strut and connects the two longitudinal struts 25 and 26 in the transverse direction y of the vehicle. A further stiffening strut 28, which is located in the space diagonal and connects the upper end of the longitudinal strut 26 to the lower end of the longitudinal strut 25, once again produces truss-like triangular structures for stiffening the support bracket 12. The stiffening strut 28 intersects the horizontal strut 27 at the intersection point 29, which is implemented to be flexurally rigid.

The struts 13, 14, 15, 16, 17, 18, 19, 20, 23, 24, 25, 26, 27, 28 are all made of fiber-reinforced plastic, preferably a CFC or GRP material.

The fastening feet 32, 33, 36, 37 are all made of metallic material, preferably steel or aluminum.

The first ends 30 and 31 of the vertical struts 14 and 15 of the main bracket are connected to first fastening feet 32 and 33 via a material-locking adhesive connection.

The first ends 34 and 35 of the longitudinal struts 25 and 26 of the support bracket 12 are connected to the second fastening feet 36 and 37 in both a material-locking and a form-locking manner.

The first fastening feet 32 and 33 and also the second fastening feet 36 and 37 are connected in a form-locking manner to a not further depicted vehicle body via not further depicted screws.

When tensile stress Fx is applied in the direction of travel or in the longitudinal direction x of the vehicle, the respective connections of the first ends 34 and 35 of the longitudinal struts 25 and 26 of the support bracket 12 to the respective second fastening feet 36 and 37 are primarily subjected to tensile stress in order to introduce the tensile stress Fx into the vehicle body. The first fastening feet 32 and 33, on the other hand, are primarily subjected to compressive stress in this load case. Since this load case is critical for the rollover device 10 according to aspects of the invention, in particular in the region of the second fastening feet 36 and 37, at least the fastenings of the second fastening feet 36 and 37 to the two first ends 34 and 35 of the longitudinal struts 25 and 26 of the support bracket 12 are designed to be robust against a tensile stress, specifically by means of the material-locking and form-locking connection.

The material-locking connection of the respective second fastening foot 36, 37 to the respective longitudinal strut 25, 26 of the support bracket 12 is preferably implemented as an adhesive connection.

The form-locking connection of the respective second fastening foot 36, 37 to the respective longitudinal strut 25, 26 of the support bracket 12 is preferably implemented as a bolt connection or as a screw connection or as a rivet connection.

In the design example, the first fastening feet 32 and 33 are connected exclusively by a material-locking adhesive connection to the first ends 30 and 31 of the vertical struts 14 and 15 of the main bracket 11. This structure ensures a robust introduction of external forces, such as the lateral force Fy or the tensile stress Fx, via the rollover device 10 into the not further depicted vehicle body.

A form-locking connection and a material-locking connection of the first ends 30 and 31 of the vertical struts 14 and 15 of the main bracket 11 to the first fastening feet 32 and 33 is alternatively possible as well.

Figure 2:
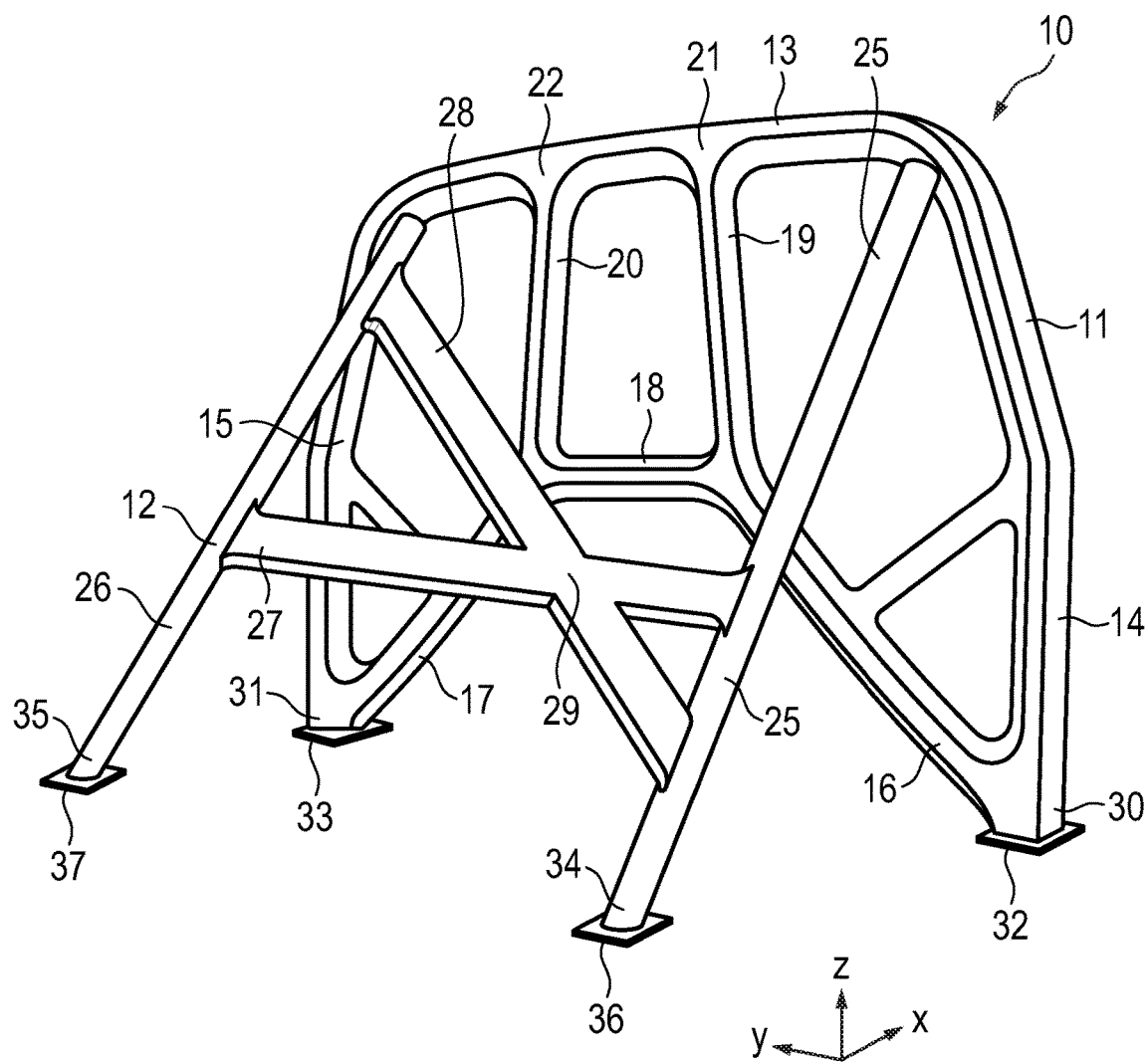
FIG. 2 is a perspective view of the rollover device of FIG. 1 from the rear.

FIG. 2 shows an advantageous embodiment of the rollover device 10 according to aspects of the invention in a perspective view from the rear, viewed in the direction of travel. The arrangement of the horizontal strut 27 and the stiffening strut 28 is particularly well visible.

Figure 3:
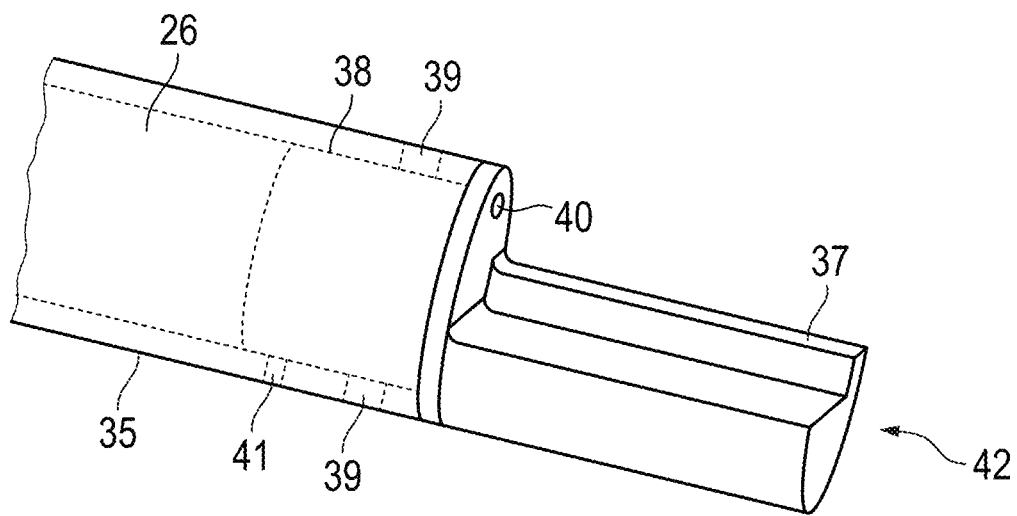
FIG. 3 is a detail view of a connection of a strut to a fastening foot.

FIG. 3 shows a detail view of an advantageous embodiment of the connection of the first end 35 of the strut 26 of the support bracket 12 to the respective second fastening foot 37. The connections of the first ends 30, 31 and 34 of the respective struts 14, 15 and 25 to the respective first fastening feet 32 and 33 or the second fastening foot 36 can be implemented in the same manner.

In an advantageous embodiment, the second fastening foot 37 comprises a partly round outer contour, which has a smaller outer diameter than the likewise round inner contour of the hollow strut 26. The second fastening foot 37 projects into the first end 35 of the strut 26 and thus forms an overlap region 38. Due to the gap between the outer contour of the second fastening foot 37 and the inner contour of the first end 35 of the strut 26 in the region of the overlap region 38, the overlap region 38 forms a volume. The connection of the first end 35 of the strut 26 and the second fastening foot 37 is implemented both in a material-locking manner as an adhesive connection and in a form-locking manner as a bolt connection. Openings 39 are provided in the first end 35 of the strut 26 for the form-locking bolt connection. The corresponding openings in the fastening foot 37 cannot be seen in FIG. 3. An introduction opening 40 for adhesive and a discharge opening 41 for adhesive are provided for the material-locking adhesive connection. The introduction opening 40 is positioned in the second fastening foot 37 such that it leads into the overlap region 38. The discharge opening 41 is positioned in the first end 35 of the strut 26 and leads out of the overlap region 38. The vehicle body-side end 42 of the fastening foot 37 is configured such that it can be connected to not further depicted receptacles on the vehicle body. For this purpose, the vehicle body-side end 42 is inserted into a receptacle in the vehicle body and releasably connected to it with a screw connection.

Figure 4:
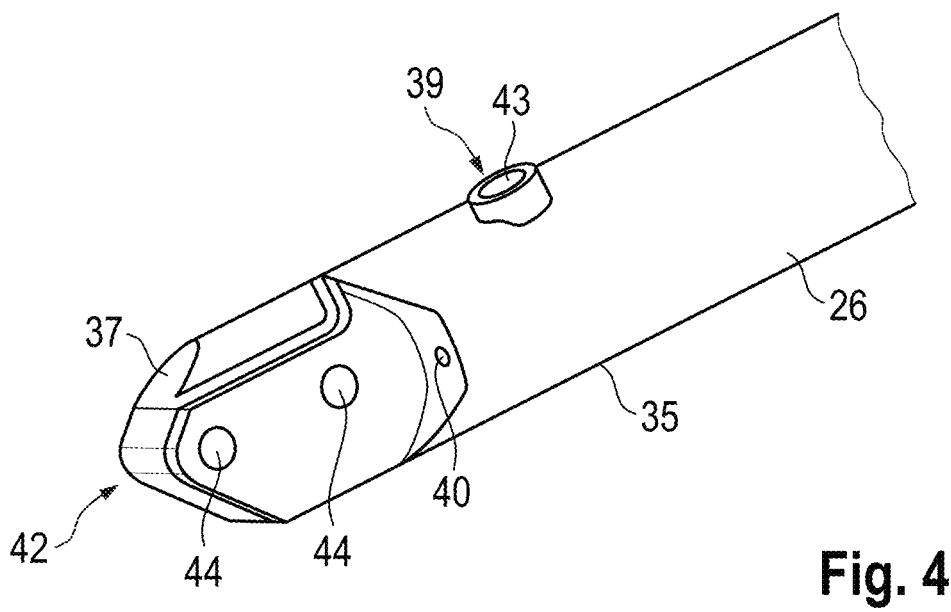
FIG. 4 is a perspective view of the connection of a strut to a fastening foot.

FIG. 4 shows another advantageous embodiment of the first end 35 of the strut 26 with the second fastening foot 37 in a perspective view. A bolt 43, which is implemented as a hollow part, is inserted in the opening 39. In order to be able to be connected to a not further depicted receptacle in the vehicle body, the vehicle body-side end 42 of the fastening foot 37 comprises two screw holes 44. The contour of the vehicle body-side end 42 is furthermore not rotationally symmetrical. This contour results in a reduction of the load on the screw connection through the screw holes 44 when the connection is torsioned in the longitudinal direction of the strut.

Figure 5:
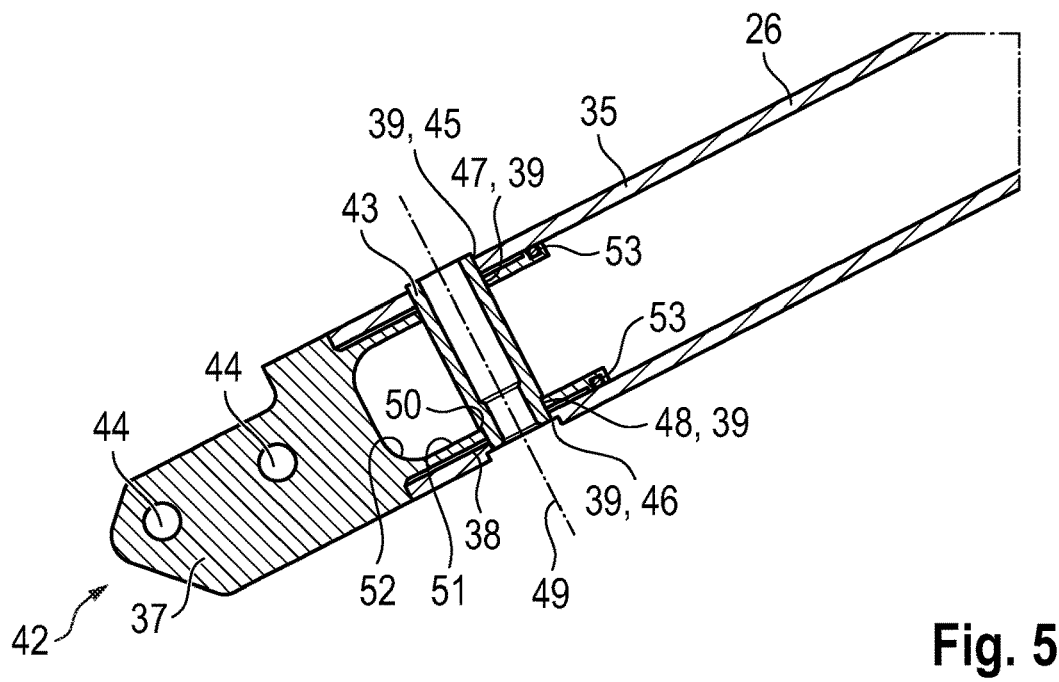
FIG. 5 is a sectional view of FIG. 4.

FIG. 5 shows a sectional view of the advantageous embodiment of the first end 35 of the strut 26 with the second fastening foot 37 of FIG. 4. The bolt 43 is hollow and projects through an opening 39 of the first end 35 of the strut 26 which is configured as the entry opening 45 and through an opening 39 of the first end 35 of the strut 26 which is configured as the exit opening 46. The fastening foot 37 comprises both a complementarily disposed entry opening 47 and a complementarily disposed exit opening 48. The longitudinal axes of the paired entry and exit openings 45, 46, 47, 48 are disposed on a straight line 49 such that the bolt 43 can be inserted through the entry openings 45, 47 and taken back out of the exit openings 46, 48 to the shown position. The entry openings 45, 47 have a larger inner diameter than the exit openings 46, 48. The bolt 43 is implemented with a recess 50 in the diameter, so that it abuts the inner side 51 of the fastening foot 37 in the region of the exit opening 48 with this shaft shoulder and cannot be pushed any further along the straight line 49 in the direction of the exit openings.

To reduce local stresses in the event of bending stress, the partly hollow fastening foot 37 is provided with a radius 52 at the transition from hollow material to solid material.

Figure 6:
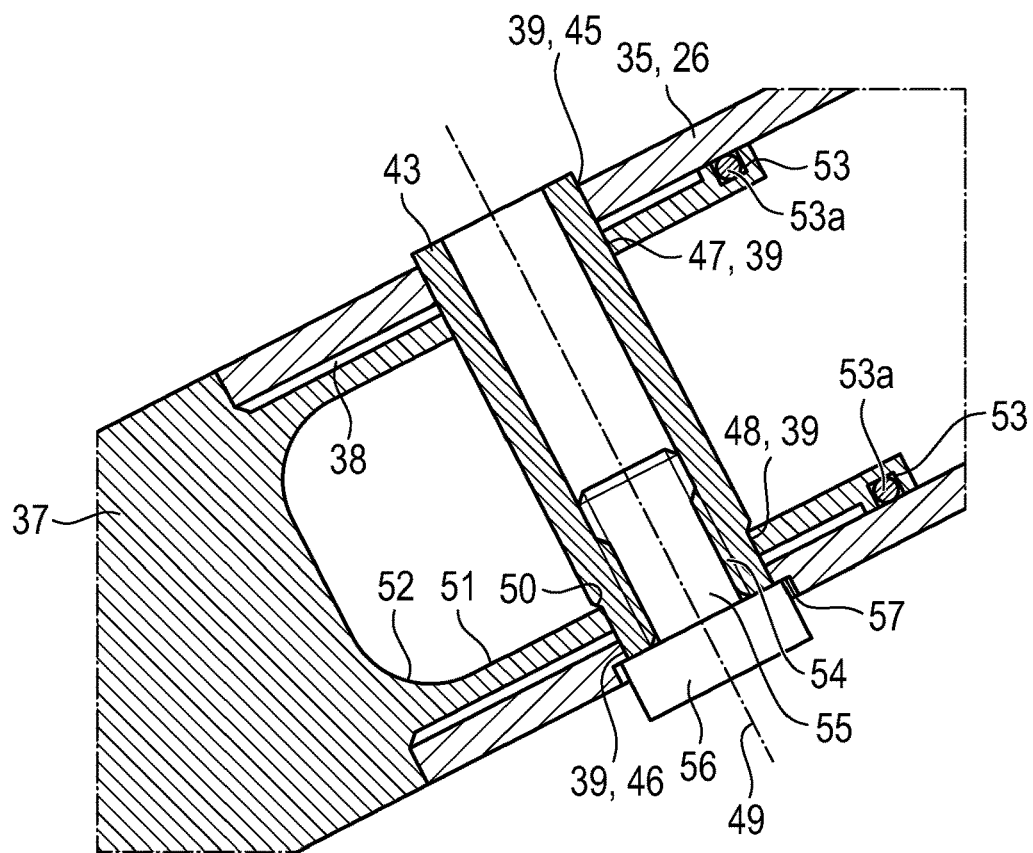
FIG. 6 is a detail of FIG. 5 together with a screw.

FIG. 6 shows a detail view of the sectional view of FIG. 5. On the fastening foot 37, there is a peripheral groove 53 in the overlap region 38 which accommodates an O-ring 53a and thus tightly closes the overlap region 38 in the direction of the strut 26. The openings 39, the entry opening 47, and the exit opening 48 are tightly closed by the inserted bolt 43, because the outer diameters of the bolt 43 are selected such that they form a press fit together with the entry and exit openings 45, 46, 47, 48. This makes it possible to ensure a process-reliable bonding of the fastening foot 37 to the first end 35 of the strut 26. Adhesive can only be introduced through the introduction opening 40 and can only exit again through the exit opening 41, both of which are not further depicted here.

In order to secure the bolt 43 against axially slipping out along the straight line 49 in the direction of the entry opening 45, an internal thread 54 is provided on the end of the bolt 32 having the smaller outer diameter, into which a screw 55 is screwed. The screw 55 comprises a screw head 56, the radial projection of which extends beyond the bolt 43 in order to secure the bolt 43 against axial movement.

The strut 26 comprises a depression 57 in the region of the screw head 56. The screw 55 thus abuts the bolt 43, but not the strut 26. The bolt 43 therefore has some play despite the recess 50 and the screw head 56, which secure the bolt 43 against axially slipping along the straight line 49. This play prevents the screw head 56 from pressing against the strut 26. To secure the bolt 43 rotationally when the screw 55 is tightened, a not further depicted hexagon socket contour is provided in the region of the bolt 43 opposite to the screw 55.

What is claimed is:

1. A rollover device for a passenger compartment of a motor vehicle, said rollover device comprising:
    a plurality of struts composed of fiber-reinforced plastic,
    a plurality of fastening feet composed of metallic material for connecting the rollover device to a vehicle body,
    wherein at least one fastening foot of said plurality of fastening feet that is composed of metallic material is connected to a respective strut of the plurality of struts that is composed of fiber-reinforced plastic via a material-locking connection as well as a form-locking connection,
    wherein the material-locking connection is an adhesive connection, and
    wherein the form-locking connection is a bolt, screw or rivet connection.

2. The rollover device according to claim 1,
    wherein the rollover device further comprises a main bracket and a support bracket for said main bracket,
    wherein the main bracket comprises (i) a transverse strut of said plurality of struts which extends in a transverse direction (y) of the vehicle and (ii) vertical struts of said plurality of struts which are positioned on either side of the transverse strut and extend in a vertical direction (z) of the vehicle,
    wherein each vertical strut includes a vertical strut end that is configured to be connected to the vehicle body,
    wherein each vertical strut end faces away from the transverse strut and includes a vertical strut fastening foot of said plurality of fastening feet,
    wherein the support bracket, which is disposed behind the main bracket, as viewed in a longitudinal direction (x) of the vehicle, comprises (i) longitudinal struts of said plurality of struts which extend in both the longitudinal direction (x) of the vehicle and in the vertical direction (z) of the vehicle and (ii) at least one stiffening strut of said plurality of struts which extends between the longitudinal struts,
    wherein each longitudinal strut includes a longitudinal strut end that is configured to be connected to the vehicle body,
    wherein each longitudinal strut end faces away from the main bracket and includes a longitudinal strut fastening foot of said plurality of fastening feet,
    wherein the longitudinal strut fastening feet are respectively connected to the longitudinal struts of the support bracket via the material-locking connection and the form-locking connection.

3. The rollover device according to claim 1,
    wherein the at least one fastening foot projects partly into a first end of the respective strut, which respective strut is at least partly hollow and forms an overlap region with the at least one fastening foot, wherein the material-locking connection is configured along the overlap region, and at least one form-locking fastening means extends through the overlap region to create the form-locking connection.

4. The rollover device according to claim 3, wherein the at least one fastening foot comprises at least one introduction opening and one discharge opening for adhesive, and the at least one fastening foot further comprises a peripheral groove in the overlap region, which is configured to receive a seal that seals the overlap region in a longitudinal direction of the respective strut.

5. A motor vehicle comprising a vehicle body, wherein said vehicle body comprises the rollover device according to claim 1, wherein a connection between the at least one fastening foot of the rollover device to the vehicle body is releasable.

6. A rollover device for a passenger compartment of a motor vehicle, said rollover device comprising:
a plurality of struts composed of fiber-reinforced plastic,
a plurality of fastening feet composed of metallic material for connecting the rollover device to a vehicle body,
wherein at least one fastening foot of said plurality of fastening feet that is composed of metallic material is connected to a respective strut of the plurality of struts that is composed of fiber-reinforced plastic via a material-locking connection as well as a form-locking connection,
wherein the at least one fastening foot projects partly into a first end of the respective strut, which respective strut is at least partly hollow and forms an overlap region with the at least one fastening foot, wherein the material-locking connection is configured along the overlap region, and at least one form-locking fastening means extends through the overlap region to create the form-locking connection,
wherein openings are disposed in the first end of the respective strut and in the at least one fastening foot in the overlap region through which openings the at least one form-locking fastening means extends, wherein the openings are implemented as an entry opening and an exit opening in the at least one fastening foot as well as an entry opening and an exit opening in the respective strut, wherein the entry and exit openings of the at least one fastening foot and the respective strut are respectively configured opposite to one another on the first end of the respective strut and in the at least one fastening foot, wherein longitudinal axes of the entry and exit openings of the at least one fastening foot and the respective strut are disposed on a straight line, wherein the entry openings of the at least one fastening foot and the respective strut have diameters that are larger than diameters of the exit openings of the at least one fastening foot and the respective strut.

7. The rollover device according to claim 6, wherein the at least one form-locking fastening means is implemented as a bolt, the bolt comprises a recess, and the recess abuts an inner side of a boundary of the exit opening of the at least one fastening foot as a stop, and thereby defines an insertion depth for the bolt.

8. The rollover device according to claim 7, wherein the bolt comprises an internal thread on an end of the bolt that is adjacent to the exit opening of the at least one fastening foot,
the bolt is secured against loosening by a screw in the internal thread,
a screw head of the screw projects beyond the bolt in a radial direction of the screw,
the first end of the respective strut comprises a depression on an outer side thereof around the exit opening of the respective strut, which is configured such that, during tightening, the screw abuts the bolt but not the first end of the respective strut.

9. The rollover device according to claim 7, wherein inner diameters of the entry and exit openings of the at least one fastening foot and the respective strut and outer diameters of bolt ends of the bolt are dimensioned such that there is a press fit at least between the bolt and the at least one fastening foot.

10. The rollover device according to claim 7, wherein the bolt is made of metallic material.

11. The rollover device according to claim 7, wherein the bolt is hollow or made of solid material in a region thereof without internal threads.

12. A method for producing a rollover device including struts made of fiber-reinforced plastic and fastening feet made of metallic material, said method comprising the following steps:
connecting at least one fastening foot made of metallic material to a respective strut made of fiber-reinforced plastic via both a material-locking connection and a form-locking connection,
wherein the material-locking connection is an adhesive connection, and
wherein the form-locking connection is a bolt, screw or rivet connection.

13. The method according to claim 12, wherein connecting the at least one fastening foot to the respective strut via the material-locking connection comprises the following steps:
inserting the at least one fastening foot into a first end of the respective strut thereby forming an overlap region between the at least one fastening foot and the respective strut, and
introducing adhesive into an introduction opening of the respective at least one fastening foot, and wherein the adhesive is configured to be pressed along the overlap region and emerge from a discharge opening.

* * * * *